United States Patent [19]

Montesi

[11] 4,043,203

[45] Aug. 23, 1977

[54] SPOON HOLDER AND MEASURING SPOON SET

[75] Inventor: Edward N. Montesi, Barrington, R.I.

[73] Assignee: Dart Industries Inc., Los Angeles, Calif.

[21] Appl. No.: 698,976

[22] Filed: June 23, 1976

[51] Int. Cl.² ............................................. G01F 19/00
[52] U.S. Cl. ......................................... 73/427; 30/324
[58] Field of Search ................... 73/426, 427; 30/424; 70/356

[56] References Cited

U.S. PATENT DOCUMENTS

| 2,237,378 | 4/1941 | Thienemann | 70/456 |
|---|---|---|---|
| 3,369,407 | 2/1968 | Hein | 73/427 |
| 3,400,591 | 9/1968 | Larson | 30/324 |
| 3,618,346 | 11/1971 | Humphery | 70/456 |

*Primary Examiner*—S. Clement Swisher
*Attorney, Agent, or Firm*—Leigh B. Taylor

[57] ABSTRACT

A plurality of measuring spoons, for measuring liquid or dry materials, each having a bowl and an integral elongated handle. The bowls vary in capacity from each other. The handles of the spoons are releasably affixed to a spoon holding ring by a slot at the end of the handle. Each slot has an arcuate section so that a tubular spoon holding ring can be snapped into the slot due to flecture of the spoon handle portions defining the slot. The slots permit the spoons to be individually pivoted on the spoon holder ring, or individual spoons can be removed from the spoon holder ring. The spoons nest together to form a compact unit. The spoon holder ring is designed to permit the entire assembly to be hung up in the kitchen in a convenient location. Each spoon is clearly marked with an indication as to its bowl capacity. Several of the spoons have a measuring ledge within the bowl and these spoons can be used to measure two different capacities depending on whether the spoon is filled to the ledge or to the top. Also, spilling from these spoons is minimized if the spoon is filled only to the ledge.

10 Claims, 11 Drawing Figures

U.S. Patent  Aug. 23, 1977  Sheet 2 of 2  4,043,203
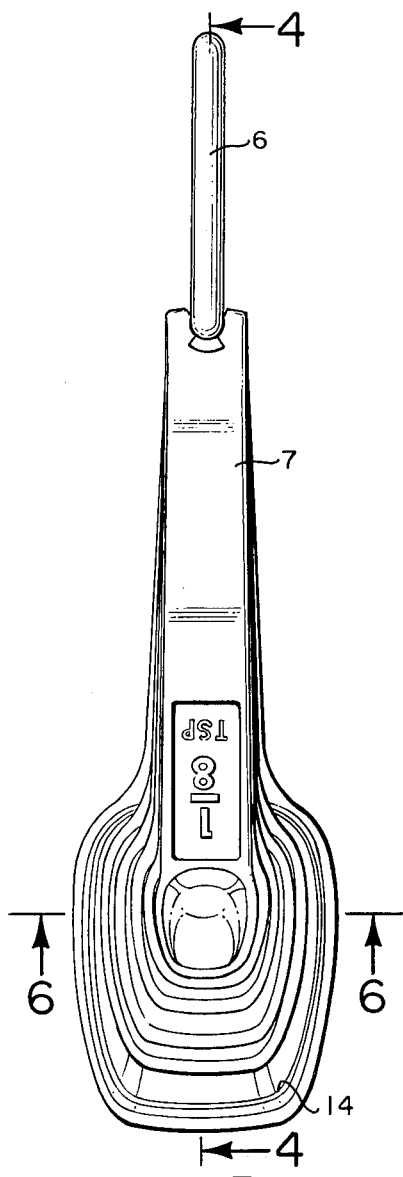
FIG.3
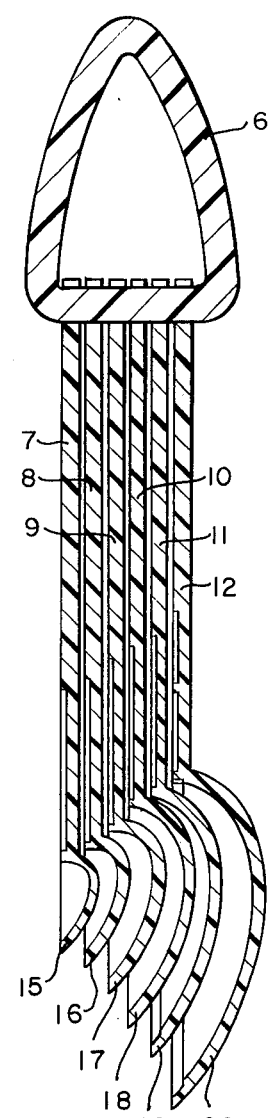
FIG.4
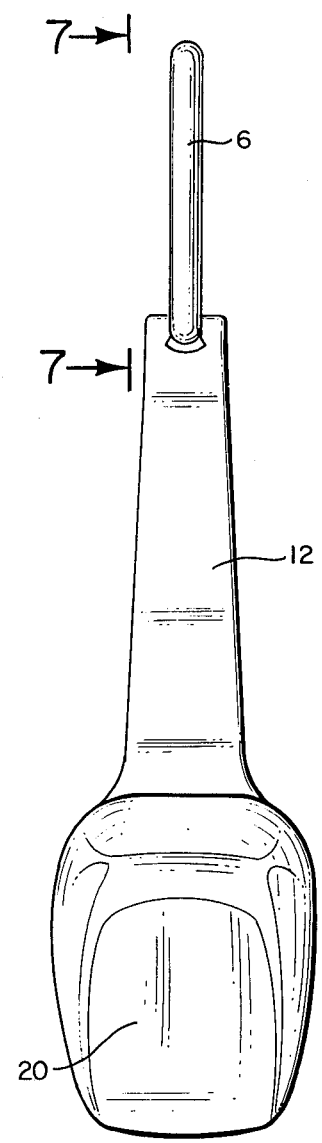
FIG.5
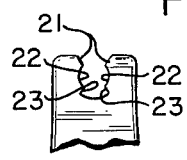
FIG.11
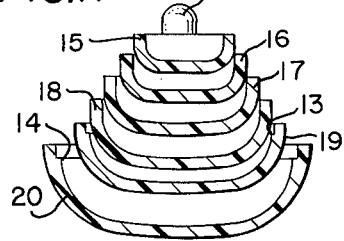
FIG.6
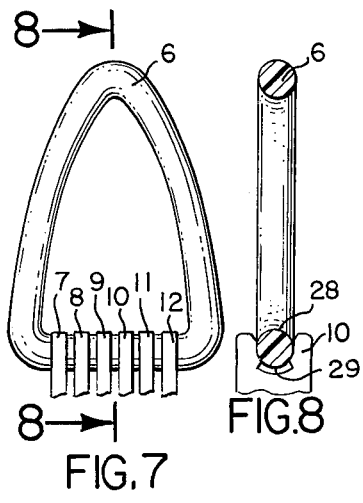
FIG.7
FIG.8
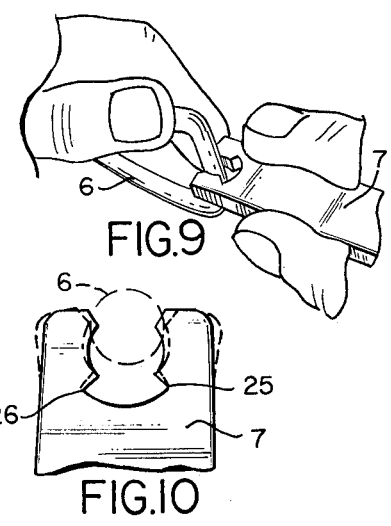
FIG.9
FIG.10

SPOON HOLDER AND MEASURING SPOON SET

BACKGROUND OF THE INVENTION

1. Field of the Invention

The present invention relates to a set of measuring spoons having a spoon holder ring to which the measuring spoons are individually releasably attached.

2. Description of the Prior Art

In general, the prior art, such as U.S. Pat. No. 184,027 show a combined measuring spoon set and holder therefor, wherein the spoons are hung from the holder which is mounted on a wall. Some of the prior art, such as U.S. Pat. No. 3,400,591 show a set of stacked measuring spoons having releasable snap fastening means in the handles whereby the spoons are snapped together in a nested fashion.

The advantages of the present invention over the structures shown in the prior art are that individual spoons can be removed from the holder without disassembling the entire set of spoons and individual spoons may be pivoted out from the set of spoons to read the capacity of the spoon as marked on the handle and to utilize the individual spoon and it can be returned easily to the set of spoons. Also, some of the spoons of the present invention serve the dual purpose of being capable of measuring two different amounts with the same spoon.

SUMMARY OF THE INVENTION

The present invention provides a set of measuring spoons that are easily used since the spoons may be rotated about a spoon holder relative to each other for easy identification of the capacity of the spoons and individual spoons may be used without disassembling the entire spoon set.

BRIEF DESCRIPTION OF THE DRAWINGS

FIG. 3 is a top plan view of the measuring spoon set with the spoons in nested position and attached to the spoon holding ring;

FIG. 4 is a cross-sectional view taken on line 4—4 of FIG. 3;

FIG. 5 is a bottom plan view of the spoons in nested position and attached to the spoon holding ring;

FIG. 6 is a cross-sectional view taken on line 6—6 of FIG. 3;

FIG. 7 is a partial side view of the spoon holding ring with the ends of the spoons attached;

FIG. 8 is a cross-section taken on line 8—8 of FIG. 7;

FIG. 9 is a perspective view showing the manner in which a spoon is attached to the spoon holding ring;

FIG. 10 is an enlarged plan view of the end of a spoon as it is joined to the spoon holding ring; and, FIG. 11 is an enlarged plan view of the end of a spoon.

DESCRIPTION OF THE PREFERRED EMBODIMENT

Figure 1:
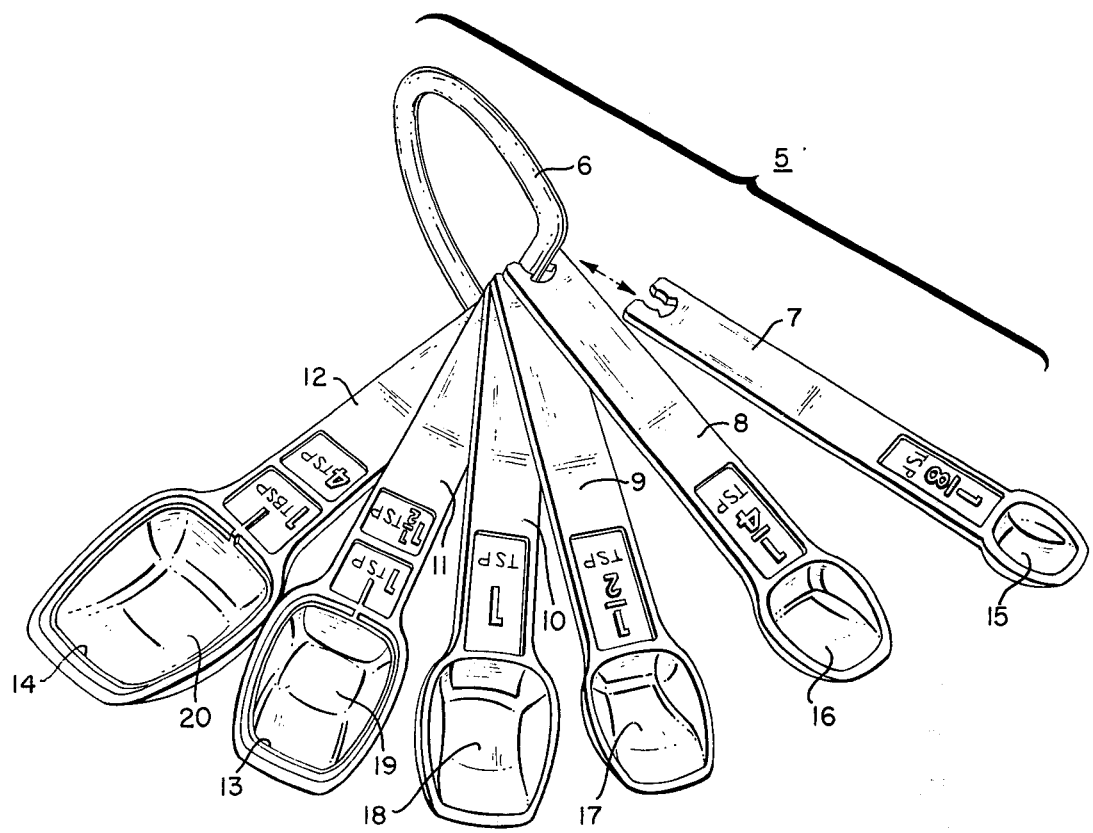
FIG. 1 is a perspective view of the measuring spoon set, with the spoons in a rotated or fanned position, and one of the spoons removed from the spoon holding ring.

FIG. 1 shows the measuring spoon set 5 including a spoon holding ring 6 and a plurality of spoons 7, 8, 9, 10, 11, and 12. The spoons can vary in number and each individual bowl capacity. In the embodiment shown, spoon 7 has a one-eighth teaspoon capacity; spoon 8 has a ¼ teaspoon capacity; spoon 9 has a ½ teaspoon capacity; spoon 10 has a 1 teaspoon capacity; spoon 11 has a dual capacity since it has continuous ledge 13 within the bowl, parallel to the top edge of the bowl, which provides a 1 teaspoon capacity to the ledge (and thus avoids spillage of the measured material) and a 1½ teaspoon capacity to the top of the bowl, and spoon 12 has a dual capacity since it has a continuous ledge 14 within the bowl, parallel with the top edge of the bowl, which provides a 1 tablespoon capacity to the ledge and a 4 teaspoon capacity to the top of the bowl.

Each of the spoons has a bowl which are individually designated 15, 16, 17, 18, 19 and 20. The configuration of each bowl is shown in FIGS. 4 and 6, and permit the measured material to be struck off level with the top edge of the bowl to give accurate measurement, and in spoons 11 and 12 they may be filled to the ledges 13 and 14 respectively. Each bowl has an integral handle extending therefrom and each handle has a slot in the free end of the handle. Each slot is identical in configuration as shown in enlarged view of FIG. 11. The slot is defined by two sloping edges 21 (which are sloped toward each other) which function to direct the ring 6 toward the center of the slot (see FIGS. 9 and 10). The sloping edges 21 slope toward and lead into opposed arcuate portions 22 which extend to outwardly sloping edges 23 which join an end wall of the slot. The slot may be broadly defined as being somewhat keyhole shaped. The arcuate edges 22 do not define a circle but rather are two opposed arcuate portions and extend for approximately 80° on each side of ring 6. The walls 23 extend outwardly in forming the slot to a greater distance than the distance between the two arcuate faces 22. Thus as shown in FIG. 10, the slot opens by flexing about pivot points 25 and 26 when the spoon holder ring 6 is pushed into the slot. Preferably the spoons and ring 6 are fabricated from a flexible plastic such as polyethylene or polypropylene which permits sufficient flexure to allow the slot to open to receive ring 6 but is sufficiently stiff to hold the spoons on the ring until they are pulled off.

The cross-sectional diameter of ring 6 is slightly greater than the distance between the most distant points between arcuate edges 22. This provides a gripping action by the spoon slot on ring 6; however, the spoons are reasonably free to pivot on the ring.

The spoon holder ring 6 is shown in the preferred embodiment as a triangular configuration; however, it may have other configurations such as round, square and the like. The cross-section through ring 6 is shown in FIG. 8 as circular; however, other cross-sections are usable so long as the slot in the spoon handle is modified to accept the other cross-sections. Even though FIG. 8 shows the cross-section through ring 6 as circular, the preferred embodiment is not circular but rather has a small flat portion on the top 28 and bottom 29 of the portion of the ring which enters the slot. This results in the ring having a greater dimension in one direction (horizontally as shown in FIG. 8) than the other direction. By properly designing the slot dimension so that the spoons are snug on the ring when in the position shown in FIG. 8, the spoons may be loosened on the ring by merely rotating the ring 90° from its FIG. 8 position.

Figure 2:
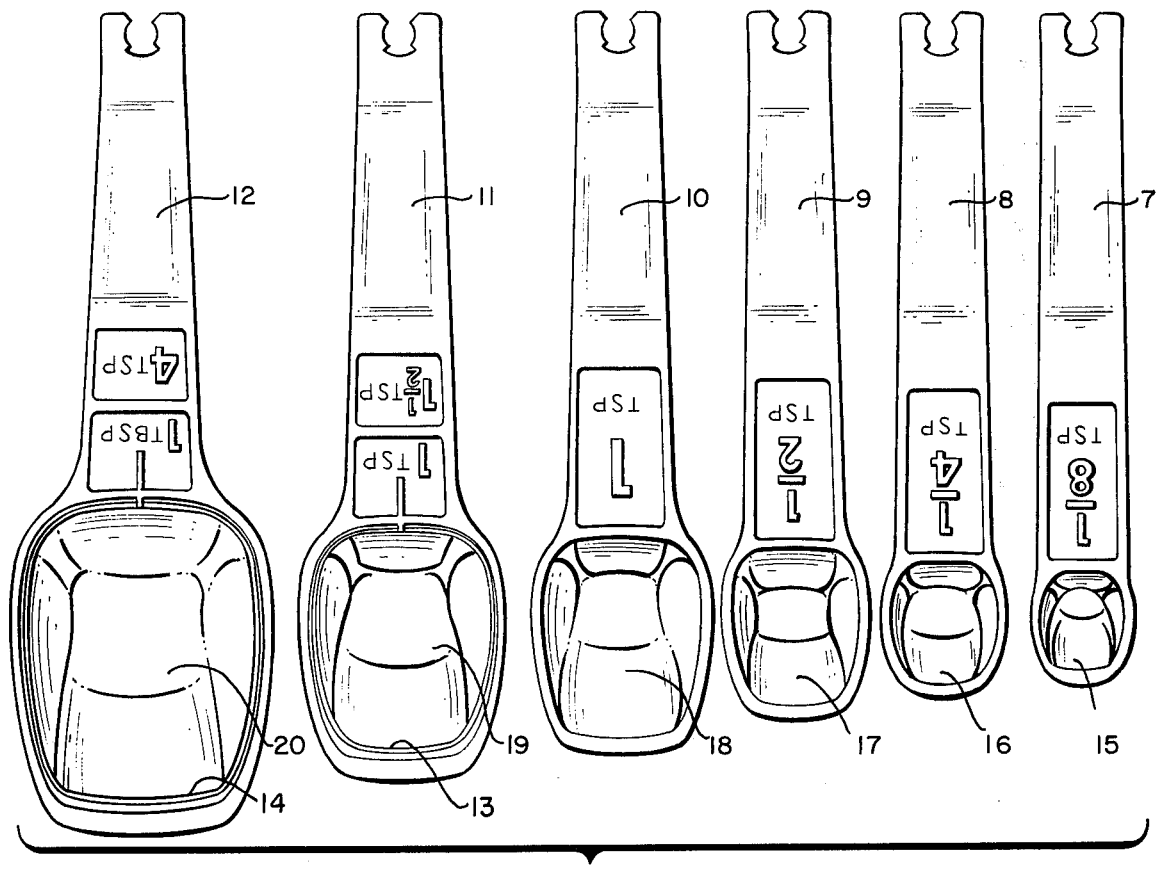
FIG. 2 is a top plan view of the individual spoons.

Each spoon may be individually pivoted around or removed from ring 6. The pivoting action is important since the bowl capacity marking (see FIG. 2) may be quickly viewed by the user to select the proper spoon.

While I have described a preferred embodiment of my invention, it may be otherwise embodied within the scope of the following claims.

I claim:

1. A measuring spoon set comprising a connecting rod and a plurality of spoons, each spoon having a handle and an integral bowl at one end thereof, each of said respective bowls having different maximum capacities, an inwardly extending slot at the end of each handle opposite the end to which the bowl is affixed said slot being partly circular in configuration and including an extension therebeyond that is wider than the circular part thereof to permit flexing of the portion of the handle on each side of the slot, and said connecting rod being substantially circular in cross-section and approximately the same diameter as the circular part of the slot so that such can snap into the slot and be removably held therein.

2. A measuring spoon set according to claim 1 wherein said connecting rod is a continuous ring.

3. A measuring spoon set according to claim 1 wherein said connecting rod is a tubular rod in the shape of a ring.

4. A measuring spoon set according to claim 1 wherein said connecting rod is in the shape of a triangle.

5. A measuring spoon set according to claim 1 wherein at least one of the bowls has a line running parallel to and spaced downwardly from the upper edge of the bowl, the capacity of the bowl below the line yielding a first quantity of measured material and the capacity of the bowl to the top edge thereof yielding a second quantity larger than the first quantity of measured material, the first and second quantities being numerically indicated on the handle of the spoon.

6. A spoon comprising a bowl with a depending elongated handle, one end of the handle being attached to the bowl and the other end being free, said free end having a slot therein, a portion of the slot nearest said free end having opposed arcuate edges, said edges being mutually facing concave areas, a second portion of the slot extending beyond said arcuate edges, said second portion having edges extending out to a greater slot width than the maximum width of the slot at the opposed arcuate edges.

7. A spoon according to claim 6 wherein the spoon is fabricated from flexible plastic material, the side walls of said slot being flexible outwardly away from each other, said side walls being so flexed about pivot axes located at the maximum width extremity of said second portion of said slot.

8. A spoon comprising a bowl with a depending elongated handle, one end of the handle being attached to the bowl and the other end being free, said free end having a slot therein, a portion of the slot nearest said free end having at least one arcuate edge forming concave area, a second portion of the slot extending along the handle beyond said at least one arcuate edge, said second portion having opposed axis areas where the distance between the handle outer edges and the axis areas is less than the distance between the handle outer edges and the mutually facing concave areas.

9. A measuring spoon set comprising a connecting rod and a plurality of spoons, each of said spoons including a handle and an integral bowl at one end thereof, each said integral bowl being of a different size than each of the others, a slot at the end of each handle opposite the end at which the integral bowl is positioned, said slot including opposed surface portions that are each of a segmented circular configuration, at least a portion of said connecting rod also is substantially circular in cross-section, which portion mates with said opposed surface portions of the spoon slots to support the spoons in close associated positions, and wherein said substantially circular rod portion includes at least one axially extending flattened surface which when positioned in mating relationship with one of said opposed surface portions frees the spoon from interference with the opposed surface portions, enabling the easy removal of the spoon from the said connecting rod.

10. A measuring spoon set according to claim 12 wherein said substantially circular rod portion includes two opposed axially extending flatened surfaces.

* * * * *